United States Patent [19]
Gersho et al.

[11] Patent Number: 5,889,891
[45] Date of Patent: Mar. 30, 1999

[54] UNIVERSAL CODEBOOK VECTOR QUANTIZATION WITH CONSTRAINED STORAGE

[75] Inventors: Allen Gersho; Kenneth Rose, both of Goleta; Sangeeta Ramakrishnan, Fremont, all of Calif.

[73] Assignee: Regents of the University of California, Oakland, Calif.

[21] Appl. No.: 561,251

[22] Filed: Nov. 21, 1995

[51] Int. Cl.[6] ................................................ H04N 7/18
[52] U.S. Cl. ........................................ 382/253; 382/239
[58] Field of Search .................................. 382/239, 253; 348/414, 417–418

[56] References Cited

U.S. PATENT DOCUMENTS

| | | | |
|---|---|---|---|
| 4,907,276 | 3/1990 | Bi et al. ................................. | 395/2.31 |
| 4,922,508 | 5/1990 | Moriya ..................................... | 375/34 |
| 4,958,225 | 9/1990 | Aldersberg .............................. | 348/422 |
| 4,979,216 | 12/1990 | Malsheen et al. ........................ | 381/52 |
| 5,067,152 | 11/1991 | Kisor et al. .............................. | 380/10 |
| 5,068,723 | 11/1991 | Dixit et al. ............................... | 358/133 |
| 5,086,480 | 2/1992 | Sexton ..................................... | 382/18 |
| 5,151,968 | 9/1992 | Tanaka et al. ............................ | 395/2 |
| 5,202,926 | 4/1993 | Miki ......................................... | 381/36 |
| 5,255,346 | 10/1993 | Wu et al. .................................. | 395/23 |
| 5,263,119 | 11/1993 | Tanaka et al. ............................ | 395/2.32 |
| 5,371,544 | 12/1994 | Jacquin et al. ........................... | 348/398 |
| 5,377,301 | 12/1994 | Rosenberg et al. ...................... | 395/2.31 |
| 5,379,350 | 1/1995 | Shimazu et al. ......................... | 382/22 |
| 5,379,642 | 1/1995 | Reckwerdt et al. ...................... | 73/625 |
| 5,384,868 | 1/1995 | Maeda et al. ............................. | 382/56 |
| 5,384,891 | 1/1995 | Asakawa et al. ........................ | 395/2.29 |
| 5,388,181 | 2/1995 | Anderson et al. ....................... | 395/212 |
| 5,390,328 | 2/1995 | Frey et al. ................................ | 395/650 |
| 5,396,292 | 3/1995 | Murata ..................................... | 348/409 |
| 5,396,576 | 3/1995 | Miki et al. ................................ | 395/2.31 |
| 5,396,625 | 3/1995 | Parkes ...................................... | 395/600 |
| 5,398,069 | 3/1995 | Huang et al. ............................. | 348/422 |
| 5,398,078 | 3/1995 | Masuda et al. ........................... | 348/699 |
| 5,400,087 | 3/1995 | Uramoto et al. ......................... | 348/699 |
| 5,410,351 | 4/1995 | Kojima ..................................... | 348/401 |
| 5,410,352 | 4/1995 | Watannabe ............................... | 348/405 |
| 5,412,484 | 5/1995 | Yoshikawa ............................... | 358/433 |
| 5,414,526 | 5/1995 | Friedman ................................. | 358/426 |
| 5,420,639 | 5/1995 | Perkins .................................... | 348/418 |
| 5,424,779 | 6/1995 | Odaka et al. ............................. | 348/416 |
| 5,428,396 | 6/1995 | Yagasaki et al. ........................ | 348/416 |
| 5,430,556 | 7/1995 | Ito ............................................ | 358/427 |
| 5,432,615 | 7/1995 | Watannabe ............................... | 358/432 |
| 5,436,674 | 7/1995 | Hirabayashi et al. ................... | 348/699 |
| 5,436,985 | 7/1995 | Li ............................................. | 382/253 |
| 5,521,988 | 5/1996 | Li et al. .................................... | 382/253 |
| 5,524,067 | 6/1996 | Miyake et al. ........................... | 382/234 |

OTHER PUBLICATIONS

Foster et al., "Finite–State Vector Quantization for Waveform Coding", IEEE Transactions on Information Theory, vol. IT–31, No. 3, May 1985.

Ramamurthi et al., "Classified Vector Quantization of Images", IEEE Transactions on Communications, vol. COM–34, No. 11, Nov. 1986.

Chan et al., "Constrained–Storage Quantization of Multiple Vector Sources by Codebook Sharing", IEEE Transactions on Communications, vol. 39, No. 1, Jan. 1991.

Chan et al., "Constrained–Storage Vector Quantization in High Fidelity Audio Transform Coding", CH2977–7/91/0000—3597, 1991 IEEE.

(List continued on next page.)

*Primary Examiner*—David K. Moore
*Assistant Examiner*—Stephen Brinich
*Attorney, Agent, or Firm*—Fish & Richardson P.C.

[57] ABSTRACT

Vectors associated with multiple sources are quantized with a codebook. A mapping function associates each source with a subset of codevectors in the codebook, each subset being defined prior to quantization. Each vector from a source is matched to a codevector in the subset corresponding to the source. The universal codebook is designed by first providing a codebook and a mapping function. Using the codebook, the mapping function is updated by identifying subsets that reduce distortion when vectors from a source are quantized using a corresponding subset.

17 Claims, 7 Drawing Sheets

OTHER PUBLICATIONS

Lyons et al., "Reduced Storage Tree–Structured Vector Quantization", O–7803–0946–4/93, 1993 IEEE.

Zeger et al., "Universal Source Coding with Codebook Transmission", IEEE Transactions on Communications, vol. 42, No. 2/3/4, Feb./Mar./Apr. 1994.

Nasrabadi et al., "Dynamic Finite–State Vector Quantization of Digital Images", IEEE Transactions on Communications, vol. 42, No. 5, May 1994.

Ramakrishnan et al., "Constrained–Storage Vector Quantization with a Universal Codebook", 1068–0314/95, 1995 IEEE.

UNIVERSAL CODEBOOK VECTOR QUANTIZATION WITH CONSTRAINED STORAGE

STATEMENT AS TO FEDERALLY SPONSORED RESEARCH

This invention was made with Government support under Grant No. NCR-9314335 awarded by the National Science Foundation. The Government has certain rights in this invention.

BACKGROUND OF THE INVENTION

This invention relates to vector quantization with a universal codebook.

Vector quantization compresses a signal vector by representing the vector with a codevector chosen from a codebook. An index identifying the codevector is transmitted as the compressed output.

The codebook is typically designed for a signal vector having a particular probability distribution. For instance, the codevectors in the codebook may correspond to the most frequent values assumed by the signal vector, in order to minimize the distortion caused by compression.

When it becomes necessary to compress signals arising from different sources (and thus having significantly different probability distributions), a different codebook is required for each source in order to minimize distortion. The increased number of codebooks increases the storage requirements of the vector quantization scheme. To alleviate this problem, some vector quantization schemes require groups of sources to share codebooks.

SUMMARY OF THE INVENTION

In general, in one aspect, the invention features a method for quantizing vectors associated with multiple sources. A mapping function associates each source with a subset of codevectors in a codebook, each subset being defined prior to quantization. Each vector from a source is matched to a codevector in the subset corresponding to the source.

Preferred embodiments of this aspect of the invention include the following features.

The sources are associated with each state of an encoder performing the quantization. Alternatively, the sources are associated with different classes of vectors.

In other embodiments, groups of vectors arising from a given source are associated with different source names. The mapping function associates a subset of the codebook with each source name. Each vector in a group is matched to a codevector in the subset associated with the source name for the group.

The mapping function identifies subsets having a different number of codevectors for different sources. In some embodiments, the subsets share a codevector.

A decoder receives an identification for the codevector matched to each vector. The identification distinguishes between different codevectors in the subset corresponding to the source.

In general, in another aspect, the invention features a method for designing the universal codebook described above, by first providing a codebook and a mapping function. Using the codebook, the mapping function is updated to identify subsets that reduce distortion when the vectors from a source are quantized using a corresponding subset.

Preferred embodiments of this aspect of the invention include the following features.

Each source is associated with a state of an encoder performing the quantization, or alternatively, with a class of vectors. In other embodiments, groups of vectors arising from a given source are associated with a different source name, the mapping function associating a subset of the codebook to each source name.

An initial codebook is formed by receiving a training set of vectors from each source, and deriving a codebook from the training sets using a generalized Lloyd Algorithm. Similarly, an initial mapping function is derived by separately performing a generalized Lloyd algorithm over a training set derived from each source.

The mapping function is formed by first receiving a training set of vectors from each source. A nearest neighbor partition cell is determined for each codevector in each subset using the training set from the source corresponding to the subset. The codevectors in each cell for each subset are then updated by finding the codevector in the codebook that minimizes the distortion. Alternatively, the codevectors are updated by finding the centroid of each cell, and quantizing that centroid using the codebook to produce the updated codevector.

The codevectors in the codebook are updated using the mapping function to further reduce the distortion. The steps of forming a mapping function and updating the codevectors are repeated until convergence.

The codebook is updated by first receiving a training set of vectors for each source. Using the mapping function, a nearest neighbor partition cell is determined for a codevector in a subset. A centroid of the vectors in the training set that fall into a particular cell is determined. The codevector in the cell is replaced with the centroid.

Advantages of the invention include the following.

The constrained storage vector quantization (CSVQ) scheme of the invention minimizes the distortion incurred by compression while employing a universal codebook of constrained size. This is achieved by optimizing the universal codebook and the mapping function prior to encoding. High reproduction quality encoding can thus be achieved (i.e., encoding having a large vector dimension and/or high resolution in bits per sample) without incurring prohibitive storage requirements.

CSVQ achieves this high performance at a lower storage requirement than schemes requiring separate codebooks to be assigned to different sources. In addition, CSVQ has both a lower storage requirement and a higher performance than schemes requiring codebook sharing. Because each codevector is typically shared by only a few sources in CSVQ, each codevector is better matched to the sources than a scheme requiring shared codebooks.

High performance is ensured by choosing any desired subset of the universal codebook as a codebook for a particular source. This allows different sources to be encoded with codebooks having a different number of codevectors, and thus allows encoding at different rates for different sources. CSVQ thus has high design flexibility, and is adaptable to a wide variety of encoding schemes.

For example, the ability to encode at different rates is particularly useful when bit allocation is employed, e.g., when the sources correspond to different components or features extracted from a given signal. Choosing subsets of appropriate size allows the bit allocation to be optimized, while the overall codebook size is constrained. This feature is also useful in structurally constrained vector quantization schemes, because it allows all the codebooks used in different stages or layers to be extracted from a universal codebook satisfying a given storage requirement.

CSVQ is particularly useful in schemes, such as tree-structured vector quantization, where the main constraint on performance is storage space.

When CSVQ is applied to adaptive vector quantization (AVQ), the universal codebook is stored at the decoder, and new subsets from that codebook are specified as the source characteristics change. This greatly reduces the bit-rate overhead incurred in periodically communicating updated codebooks to the decoder. If fixed-rate coding is used to specify the subsets, the storage space required by the codebook (which determines the rate cost of updating the codebook) becomes a key performance limitation. CSVQ, by constraining the size of the universal codebook, greatly reduces this rate cost.

CSVQ can be applied to existing AVQ schemes to derive the universal codebook, with the initial mapping function providing an estimate of how the source will change over time. Standard AVQ techniques can then be used to update the subset chosen from the universal codebook for encoding. For example, vectors specifying a new subset are transmitted from the encoder to the decoder. The decoder then quantizes the vectors using the universal codebook, and the quantized vectors form the new subset.

Similarly, in classified vector quantization (CVQ) and finite state vector quantization (FSVQ), the critical performance limitation is the storage required for the class-specific or state-specific codebooks. Applying CSVQ to these schemes allows a single universal codebook to replace all the class or state specific codebooks. Codebooks for each state or class are selected as subsets of the universal codebook. This permits an increase in the number of states or classes without increasing the memory requirement.

When applied to FSVQ, CSVQ provides additional flexibility by allowing the universal codebook to employ any memory size. Existing FSVQ has only limited memory sizes corresponding to an integer number of states. Experimental application of CSVQ to FSVQ outperforms standard FSVQ (in terms of signal-to-noise ratio versus number of codevectors to be stored) at all memory sizes. This is shown in detail in "Constrained-Storage Vector Quantization with a Universal Codebook", Ramakrishnan, S. et al., Proceedings of the Data Compression Conference, Snowbird, Utah, 3/28/95–3/30/95, Computer Science Press, pp. 42–51, incorporated herein by reference.

Other features and advantages will become apparent from the following description and from the claims.

DESCRIPTION OF THE PREFERRED EMBODIMENT(S)

Figure 1:
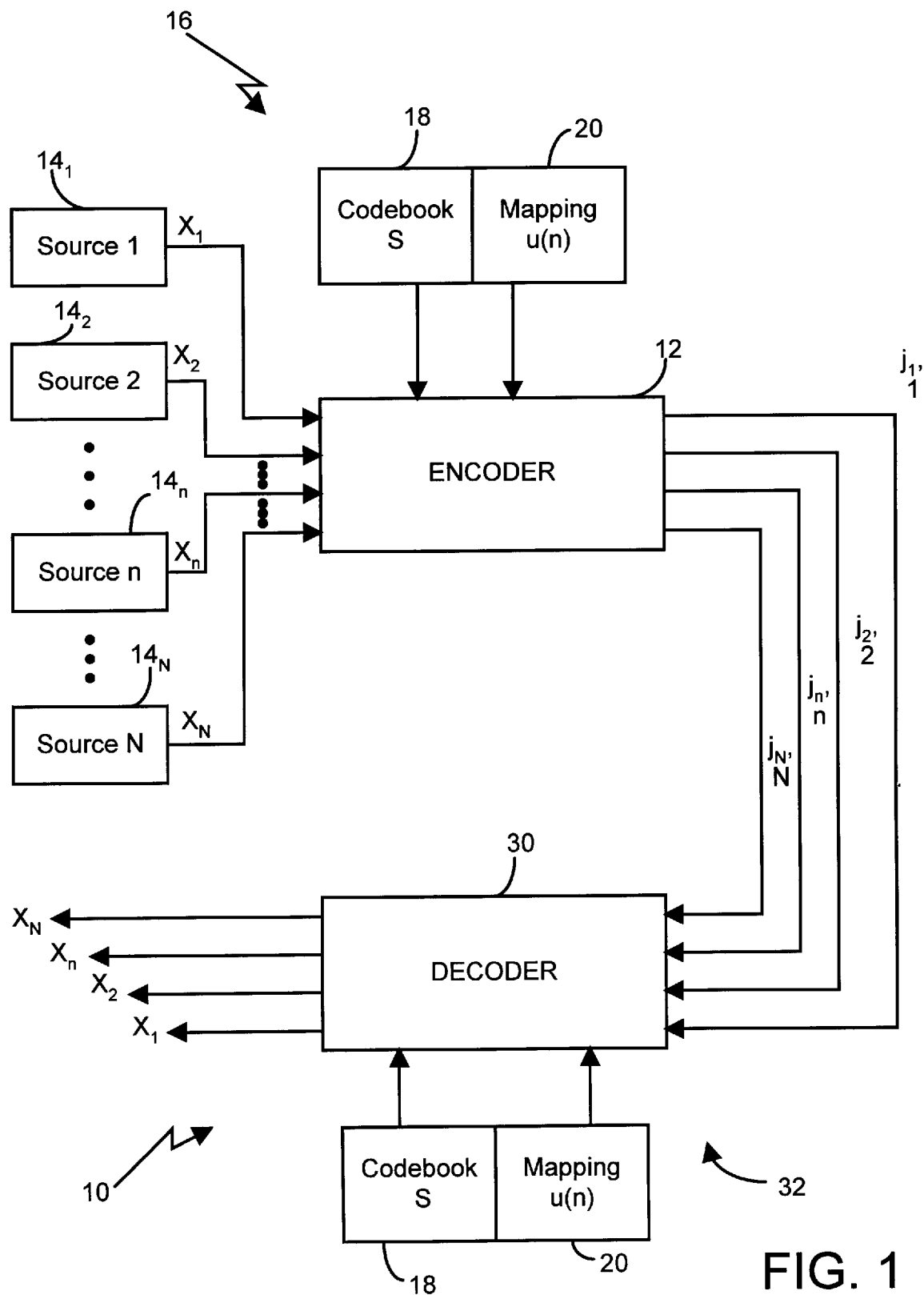
FIG. 1 is a schematic diagram of a constrained storage vector quantization (CSVQ) system.

Referring to FIG. 1, a constrained storage vector quantization (CSVQ) system 10 has an encoder 12 receiving signals $X_1, X_2, \ldots, X_n, \ldots, X_N$ from sources $14_1, 14_2, \ldots, 14_n, \ldots, 14_N$, respectively. Each signal contains information expressed as a k-dimensional vector. For example, signal $X_1$ may contain five components ($X_1=[0,0,0,1,1]$), where each component indicates the color of a particular pixel in a fax image. Although the encoder receives the different signals in parallel in FIG. 1, the signals may also be received in series.

Each source $14_n$ supplies a different type of signal, with a different probability distribution, to the encoder. For example, source $14_1$ may correspond to a fax, and source $14_2$ can provide video images. Alternatively, each source provides a different class of images, such as portraits, textures, medical images and text documents, to the encoder. In some applications, the encoder assigns a different source index (n) to different features extracted from a single signal. In other schemes, for example, when the encoder performs adaptive vector quantization (AVQ), the encoder treats signals arriving from a single source at different times as arising from separate sources. If the encoder performs finite state or classified vector quantization (FSVQ or CVQ), the encoder classifies each state or class as a different source. FSVQ and AVQ are discussed in more detail below.

Figure 2A:
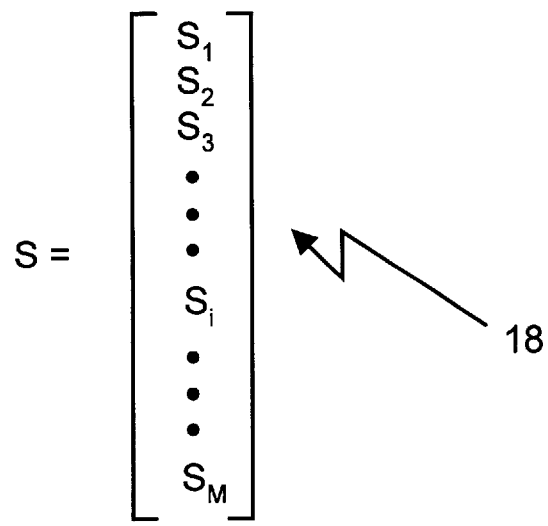
FIG. 2a is a matrix representing a universal codebook employed in the CSVQ system of FIG. 1.
Figure 2B:
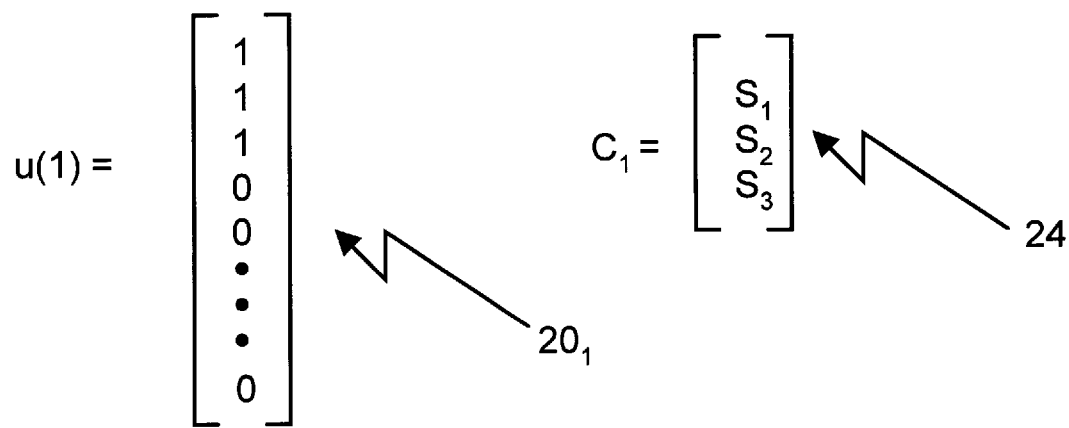
FIGS. 2b and 2c are examples of mapping functions and subsets for two different sources in the CSVQ system of FIG. 1.
Figure 2C:
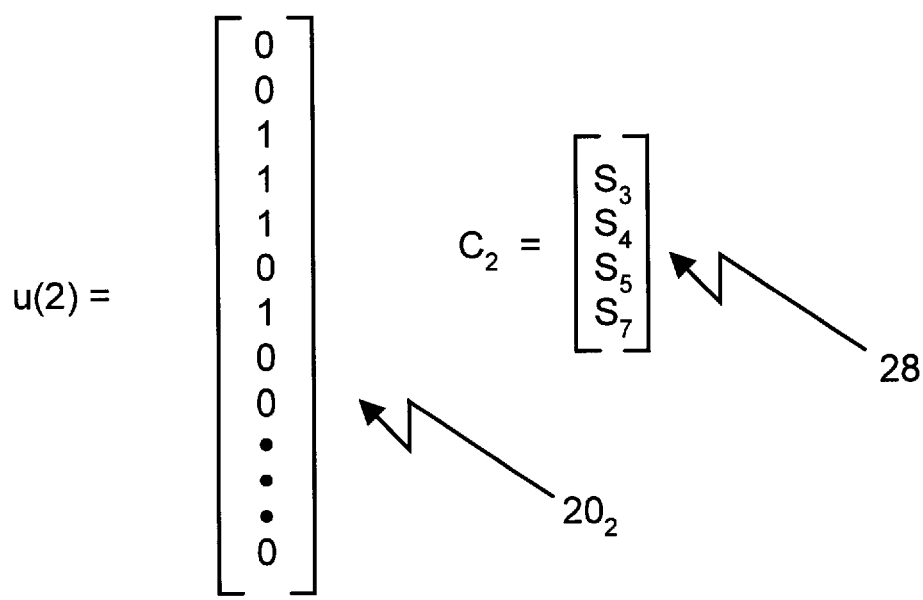

Referring also to FIGS. 2a through 2c, encoder 12 has storage 16 containing a universal codebook (S) 18 having k-dimensional codevectors $s_1, s_2, \ldots, s_i, \ldots, s_m$. Storage 16 also contains a mapping function u(n) 20 for each source. The universal codebook together with the mapping function completely specify the encoder.

The mapping function is a binary vector of dimension M, such that:

$$u_i(n) = 1 \text{ if } s_i \in C_n \quad (1)$$
$$= 0 \text{ if } s_i \notin C_n$$

The mapping function thus identifies a subset $C_n$ of $I_n$ codevectors in the codebook for each source, such that:

$$C_n = \{s_i; u_i(n)=1\} \quad (2)$$

where exactly $I_n$ components of u(n) are equal to one. In the examples shown in the figures, mapping function u(1) $20_1$ for source $14_1$ indicates that $C_1$ 24 includes codevectors $s_1$, $s_2$, $s_3$ (FIG. 2b). Similarly, mapping function u(2) $20_2$ for source $14_2$ indicates that $C_2$ 28 includes codevectors $s_3$, $s_4$, $s_5$ and $s_7$. Different sources may thus have subsets sharing the same codevectors, and may have subsets containing a different number of codevectors.

The number (M) of codevectors in the universal codebook is constrained to be fewer than the total number of codevectors in all the subsets $C_n$, that is $$M << \Sigma_n I_n$$

This is necessary to reduce the storage requirements for the universal codebook, compared to schemes storing a separate codebook for each source.

The encoder receives each signal $X_n$ along with its source identifier (n), and matches $X_n$ to the closest codevector $x_n$ in the corresponding subset $C_n$ for the source $14_n$. This is typically done by choosing the codevector $x_n$ in the subset that minimizes the distortion $d(X_n, x_n)$ (e.g., the squared distance between the signal $X_n$ and the codevector) over all the codevectors in the subset. The encoder output includes an index n identifying the source of the signal (and thus the appropriate subset $C_n$), and an index $j_n$ specifying the codevector $x_n$ in the subset. The encoder thus represents the signal $X_n$ with two indices (n, $j_n$) that together require fewer bits than the signal itself. For example, if fixed-rate encoding is used, $\log_2 I_n$ bits are transmitted to specify $j_n$. Alternatively, only an index uniquely identifying the appropriate codevector over the entire universal codebook can be transmitted, at a higher overhead.

A decoder 30 that regenerates $x_n$ from the indices n and $j_n$ has storage 32 containing both the universal codebook S 18 and the mapping function u(n) 20. The decoder accesses the mapping function u(n) and universal codebook S to find the subset $C_n$ of codevectors corresponding to the source n. The decoder next uses the index $j_n$ to identify the particular codevector $x_n$ in the subset. The decoder then produces the signal $x_n$ which is a close approximation of the original input signal $X_n$.

In some applications, the encoder does not transmit the index (n) to the decoder, e.g., when the decoder is capable of determining the index from some prior available information, such as in FSVQ (discussed below). In other contexts, it is useful to reduce the overhead by limiting the number of times the index (n) is transmitted to the decoder. For example, in adaptive vector quantization, the source changes infrequently so that a number of successive signals are treated as arriving from the same source.

The design considerations for the universal codebook and the mapping function are the following.

The set of M codevectors in the universal codebook and the mapping function u(n) are chosen to be optimal, i.e., they jointly minimize the overall distortion D of the quantization scheme. The distortion is given by:

$$D = \sum_{n=1}^{N} w_n E[d(X_n, x_n)] \quad (4)$$

where $Ed(X_n, x_n)$ is the expected distortion incurred by quantizing $X_n$ to the codevector $x_n$ in subset $C_n$, employing the probability distribution of $X_n$. The distortion can be calculated by a variety of methods; the least square error method is described below, in connection with Equation (8).

The factors $w_n$ in Equation (4) are non-negative weights which reflect the relative importance of the distortion incurred in quantizing $X_n$. The weights are constrained by:

$$\sum_{n=1}^{N} w_n = 1 \quad (5)$$

The weights are typically measured from the relative frequencies of occurrence of the signals $X_n$ from the different sources.

Figure 3:
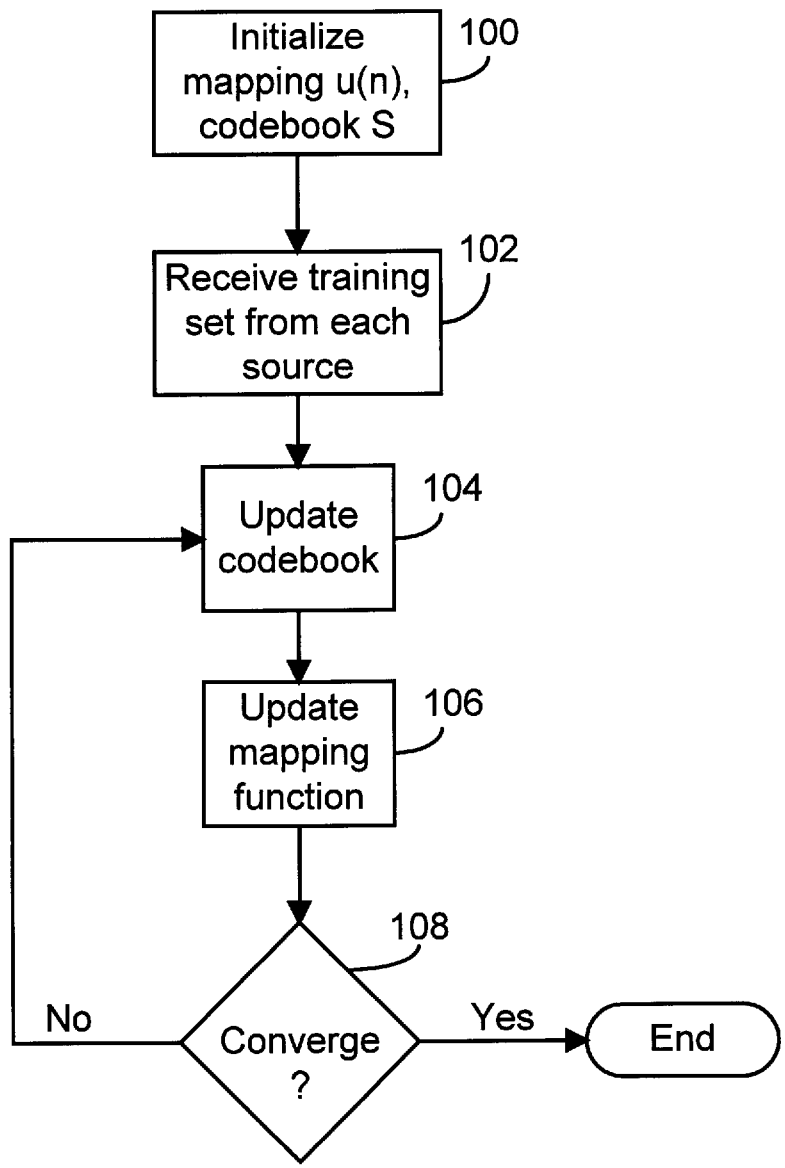
FIG. 3 is a generalized algorithm for deriving the universal codebook and the mapping function employed in the CSVQ system of FIG. 1.

Referring to FIG. 3, the encoder and decoder are designed by first stipulating an initial mapping function and universal codebook (step 100). A training set of signals $X_n$ is then obtained from each source (step 102), where the training set accurately reflects the probability distribution of the signals. The codebook is then updated by using the training sets to optimize the codebook for the initial mapping function (step 104). Using the optimized codebook, the mapping function is then optimized (step 106). If, in step 108, the overall distortion (given in Equation (4)) has converged (i.e., been reduced to zero), the process ends. Otherwise, the process repeats by returning to step 104. The process is guaranteed to converge since each step is monotonically non-increasing in distortion.

Computation time is saved by determining the process has converged when the distortion has changed from that in a previous iteration by less than a given fraction, e.g., $10^{-3}$. Alternatively, convergence is flagged when the distortion falls below a set threshold, or after a given number of iterations have been performed.

In step 104, the universal codebook is optimized by minimizing the distortion incurred by representing a signal $X_n$ with the codevector $x_n$. The overall distortion D (given in Equation (4)) is calculated using the following expansion:

$$D = \sum_{n=1}^{N} w_n \sum_{j:u_j(n)=1} E[d(X_n, s_j)|X_n \in R_{jn}] P[X_n \in R_{jn}] \quad (6)$$

where $w_n$ are non-negative weights constrained by Equation (5).

Figure 4:
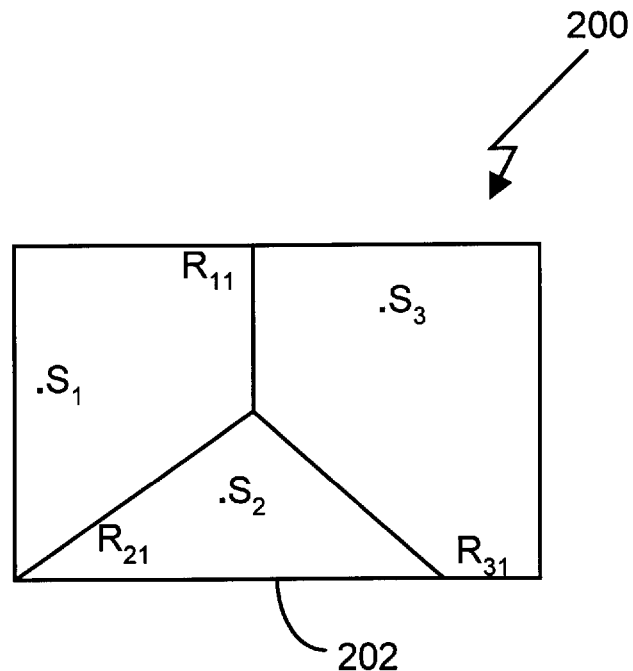
FIG. 4 is a schematic representation of nearest neighbor partition cells for the subset of FIG. 2b.

$R_{jn}$ in Equation (6) is the nearest neighbor partition cell corresponding to the codevector $s_j$ when subset $C_n$ is used, and assuming that $s_n$ is a member of subset $C_n$. In the two dimensional schematic representation of FIG. 4, each vector $s_i$ in subset $C_1$ is depicted as a point in the space 200 of all vectors $X_n$. Assuming that the distortion measure $d(X_n, x_n)$ is the squared distance between $X_n$ and $x_n$, partition $R_{j1}$ corresponds to the area that includes all vectors $X_n$ closer to $s_j$ than to all other codevectors $s_i$ in the space. For example, all vectors $X_n$ falling in cell $R_{21}$ 202 are closer to $s_2$ than to $s_1$ or $s_3$, and thus will be quantized such that $x_n = s_2$. For a particular mapping function, the subset $C_n$ and each cell $R_{jn}$ is uniquely defined.

The first term in the second summation of Equation (6) is the expected distortion when $X_n$ is quantized as $s_j$, if $X_n$ is in the cell $R_{jn}$.

The second term in the second summation is the probability that $X_n$ falls in the cell $R_{jn}$. This is obtained from the training sets from each source in a standard manner.

Given the mapping function u(n) (and thus the cells $R_{jn}$ and the codebooks $C_n$), each codevector $s_j$ in the universal codebook is defined by the centroid:

$$s_j = \frac{1}{\left(\sum_{n:u_j(n)=1} w_n\right)} \sum_{n:u_j(n)=1} w_n E(X_n|X_n \in R_{jn}) \quad (7)$$

which minimizes the overall distortion D (Equation (6)).

After the codebook is optimized in step 104, the mapping function is re-adjusted to further minimize the distortion in step 106, as follows.

Optimizing the mapping function implies choosing a subset of $I_n$ codevectors from the set of M codevectors in S that minimizes the expected distortion $E[d(X_n, x_n)]$ over all codebooks of size $I_n$ that can be extracted from S. This must be repeated for each of the N sources generating signals. There are generally too many possible choices $(M!/(M-I_n)!I_n!)$ to exhaustively try each possible subset.

Figure 5:
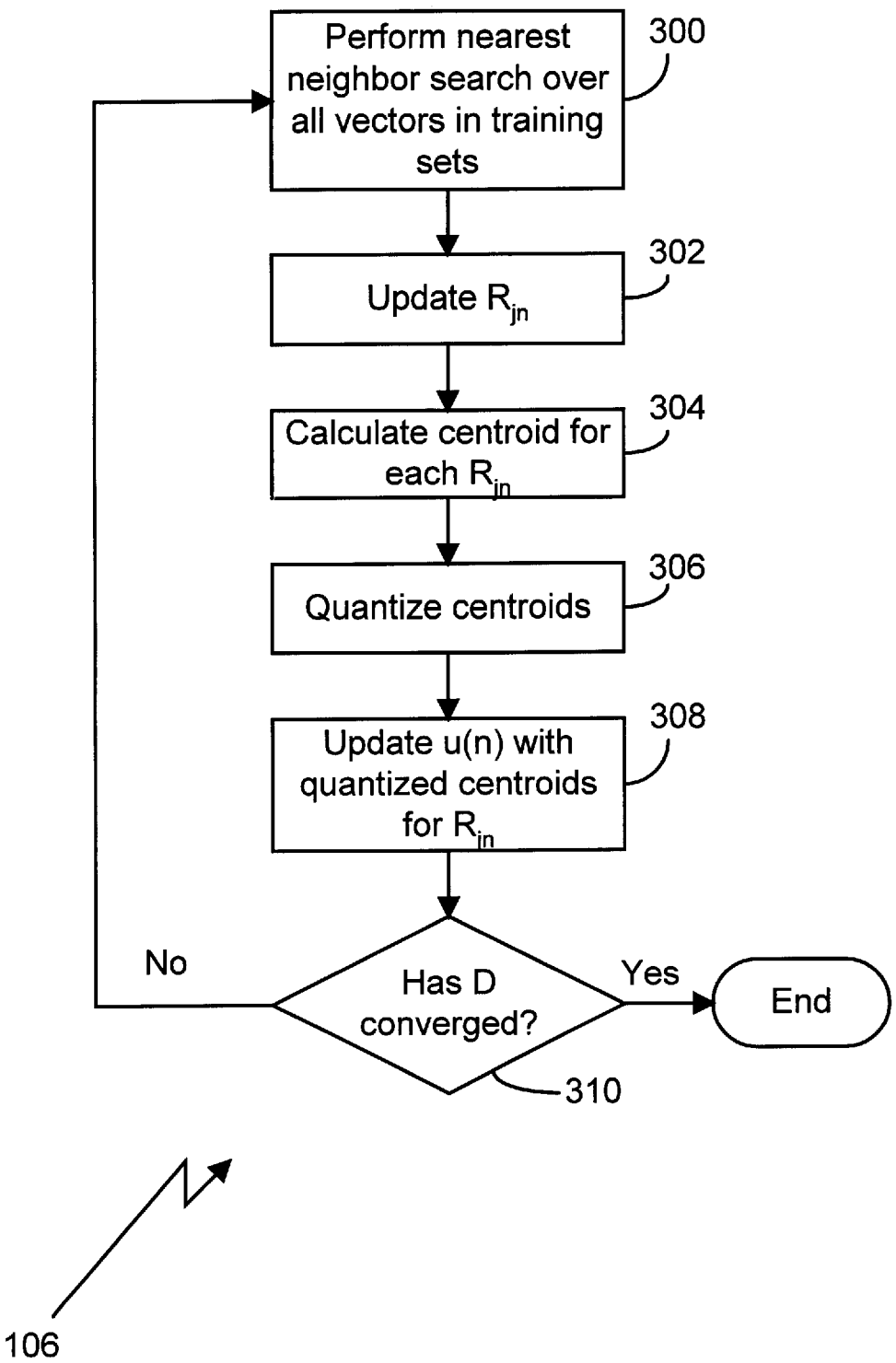
FIG. 5 is an algorithm for optimizing the mapping function as performed in step 106 of FIG. 3.

Referring to FIG. 5, a more practical method begins by receiving a training set of signals from each source, and then repeating each of steps 300–310 for each source. In step 300, each signal (e.g, $X_{Xn1}, X_{n2}, \ldots$) in the training set arriving from a particular source $14_n$ is matched to its closest codevector in its corresponding subset $C_n$. The group of signals corresponding to a particular codevector $s_j$ thus define the cell $R_{jn}$ for that codevector. After the partition is updated in this manner in step 302, the codevector $s_j$ for the partition is updated, with the constraint that the updated codevector is a member of the universal codebook. This is done by finding the codevector that minimizes the distortion caused by quantizing each signal in $R_{jn}$ with the updated codevector, e.g., by trying all the codevectors in the codebook and selecting the one that minimizes the distortion.

If the measure of the distortion is the squared error, this step is simplified by computing the centroid for each partition (step 304) and quantizing each of the centroids using the universal codebook (step 306).

The mean squared error distortion $D_{jn}$ for a particular cell is given by:

$$D_{jn} = E[(X_n - s_i)^2 | X_n \in R_{jn}] = E[(X_n - m_{jn})^2 | X_n \in R_{jn}] + (m_{jn} - s_i)^2 \quad (8)$$

where $$m_{jn}=E[(X_n|X_n \epsilon R_{jn}]  \quad (9)$$

is the computed centroid of cell $R_{jn}$. Equations (8) and (9) indicate that minimizing the distortion $D_{jn}$ requires choosing $s_i$ to be $m_{jn}$ quantized to the nearest universal codevector.

The quantized centroids $m_{jn}$ thus define the updated subsets $C_n$ for each source. After quantizing the centroids in step 306, u(n) is updated to reflect the inclusion of the quantized centroids in the updated subsets (step 308). If the distortion has converged after step 308 (step 310), the process ends. Otherwise, the process returns to step 300 for another iteration.

Because each of steps 300–310 does not increase the distortion, the method will converge to at least a local optimum.

Figure 6:
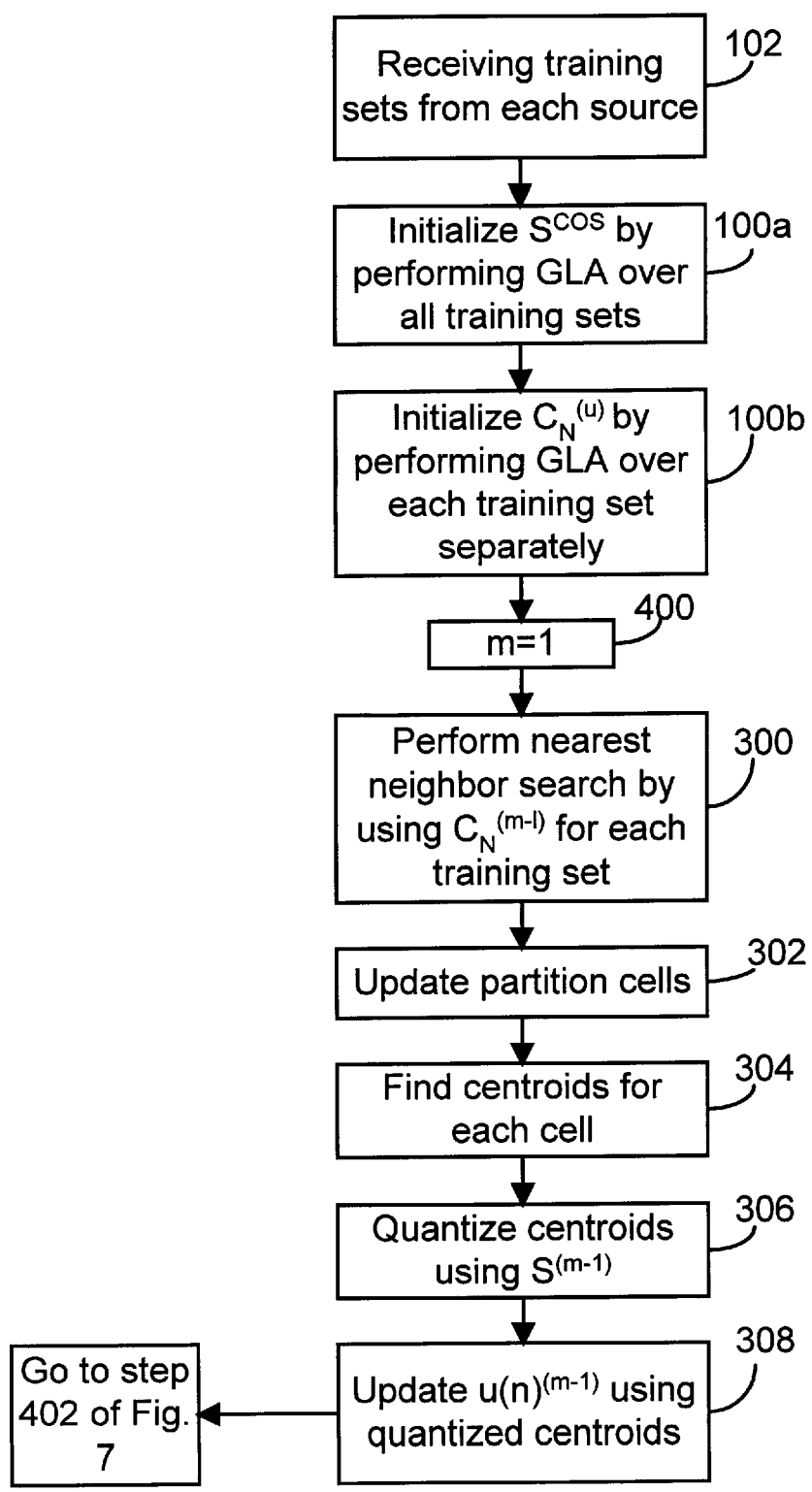
FIGS. 6 and 7 are one implementation of the algorithm of FIG. 3.
Figure 7:
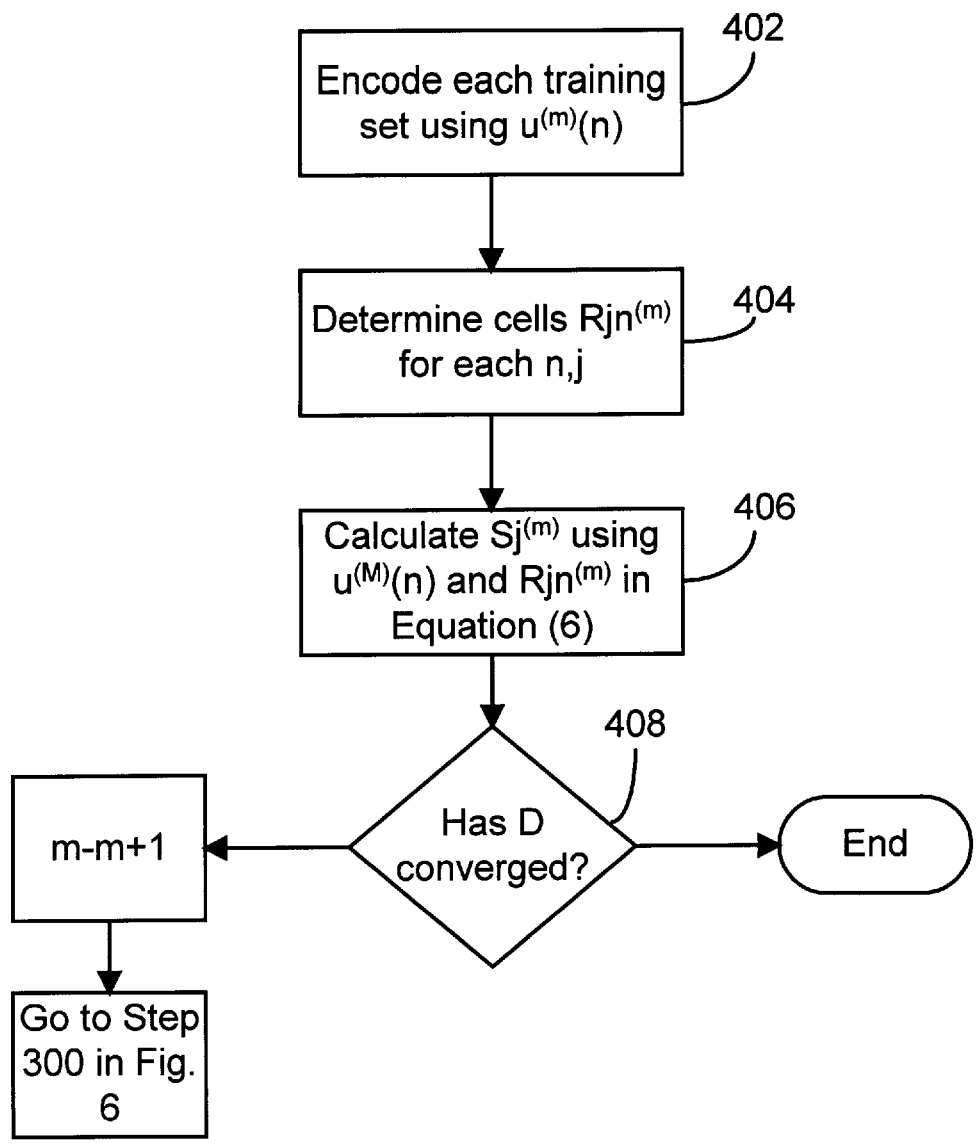

Referring to FIGS. 6 and 7, a practical implementation of the process of FIG. 3 involves first obtaining the probability distributions of the signals arising from each source. This is done by obtaining training sets of signals from each source (step 102) and approximating the probability distribution of each source by assuming a uniform probability over the samples in the training set.

A generalized Lloyd algorithm (GLA) is employed over all the training data to generate an initial universal codebook $S^{(0)}$ (step 100a). GLA is described in detail in "An algorithm for vector quantizer design", Y. Linde et al., IEEE Trans. Commun., vol. COM-28, pp. 84–95, Jan. 1980.

Next, initial subsets $C_n^{(0)}$ are computed by applying GLA separately to each training set (step 100b). The subsets define the initial mapping function $u^{(0)}(n)$. The index of the iteration m is then initialized to 1 (step 400).

The mapping function is next updated by performing a single iteration of the method described in connection with FIG. 5. The method is not iterated until convergence because it is generally inefficient to optimize the mapping function for an intermediate, non-optimal universal codebook.

The iteration involves first updating the partition cells for each subset. This is done by performing a nearest neighbor encoding of each training set vector for each source using the corresponding codebook $c_n^{(m-1)}$, as described above in connection with step 300 of FIG. 5.

Next, the partition cells are updated (step 302) and the centroid for each partition of each source is computed, using Equation (9) (step 304). Each of these centroids is then quantized using the latest universal codebook $S^{(m-1)}$ (step 306). The quantized centroids form $C_n^{(m)}$ and define the mapping function $u^{(m)}(n)$ (step 308).

The universal codebook is then updated by quantizing the training set for each source, using the mapping function $u^{(m)}(n)$ (step 402). The signals in the training set that are quantized to a particular codevector $s_j^{(m-1)}$ in codebook $S^{(m-1)}$ define the partition $R_{jn}^{(m)}$ (step 404). Using the cells $R_{jn}^{(m)}$ and the mapping function $u^{(m)}(n)$, each codevector $s_j^{(m)}$ is obtained from Equation (6) (step 406).

The distortion is then checked for convergence (step 408). If it has converged, the process ends. If it has not converged, the index m of the iteration is incremented by one, and the process returns to step 300 in FIG. 6.

When CSVQ is applied to adaptive vector quantization (AVQ), training sets reflecting how the source changes over time are first obtained. Using these training sets, a mapping function and universal codebook are derived in the manner described above.

The mapping function and the universal codebook are stored at the decoder and encoder, in a manner analogous to that shown in FIG. 1. The encoder transmits a new index n to the decoder when it determines that the source characteristics have changed.

Alternatively, the encoder and decoder do not employ the mapping function, but generate a new subset for the source when the source characteristics change, in a conventional manner. For example, the encoder may transmit a set of vectors to the decoder that specify the new subset. The decoder then quantizes these vectors using the universal codebook to generate the new subset. It is therefore not necessary for the encoder to transmit the index (n) to the decoder. In this type of application, the mapping function only provides a tool for deriving the universal codebook.

When applied to FSVQ, the codebooks for each state are first derived using a standard method. A union of the codebooks is used as the training set for deriving the initial universal codebook (step 10a in FIG. 6). Each codebook is used as a separate training set for deriving the initial mapping function (step 100b in FIG. 6) The source index n is not transmitted from the encoder to the decoder (except for an initial transmission), since the decoder derives the current state from the previous state and the previous decoder output.

The present invention has been described in terms of a preferred embodiment. The invention, however, is not limited to the embodiment depicted and described. Rather, the scope of the invention is defined by the appended claims.

What is claimed is:

1. A method for guantizing vectors associated with multiple sources, comprising:

providing a mapping function associating each source with a subset of codevectors in a codebook and forming subsets sharing a codevector; and matching each vector from a source to a codevector in the subset corresponding to the source, each subset being defined prior to said matching.

2. A method for quantizing vectors associated with multiple sources, comprising:

providing a mapping function associating each source with a subset of codevectors in a codebook;

matching each vector from a source to a codevector in the subset corresponding to the source, each subset being defined prior to said matching; and providing to a decoder an identification for the codevector matched to each vector.

3. The method of claim 2 further comprising providing to the decoder an identification of the source of each vector, the identification for the codevector distinguishing between different codevectors in the subset corresponding to the source.

4. A method for quantizing vectors associated with multiple sources, comprising:

providing a mapping function associating each source with a subset of codevectors in a codebook;

matching each vector from a source to a codevector in the subset corresponding to the source, each subset being defined prior to said matching; and associating each state of an encoder with a source.

5. A method for quantizing vectors associated with multiple sources, comprising:

providing a mapping function associating each source with a subset of codevectors in a codebook;

matching each vector from a source to a codevector in the subset corresponding to the source, each subset being defined prior to said matching; and associating each class of vectors with a source.

6. A method for quantizing vectors associated with multiple sources, comprising:

providing a mapping function associating each source with a subset of codevectors in a codebook;

matching each vector from a source to a codevector in the subset corresponding to the source, each subset being defined prior to said matching; and associating groups of vectors arising from a given source with a different source name, the mapping function associating a subset of the codebook with each source name, each vector in a group being matched to a codevector in the subset associated with the source name corresponding to the group.

7. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and updating the codevectors in the codebook using the mapping function to further reduce the distortion.

8. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and repeating the steps of forming a mapping function and updating the codevectors until convergence.

9. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset;

forming the mapping function, including:
receiving a training set of vectors from each source;
determining a nearest neighbor partition cell for each codevector in each subset using the training set from the source corresponding to the subset, and
updating the codevector in each cell for each subset.

10. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and updating the codevector comprises finding the codevector in the codebook that minimizes the distortion for the cell.

11. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset;

updating the codevector comprises finding the centroid of each cell, and quantizing that centroid using the codebook to produce the updated codevector.

12. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and updating the codebook, including:
receiving a training set of vectors for each source,
for each codevector in a subset, finding from the mapping function a nearest neighbor partition cell associated with the codevector,
for each nearest neighbor partition cell in a subset, determining a centroid of the vectors that fall in the cell, the vectors arriving from a source associated with the subset, and
replacing the codevector in the cell with the centroid.

13. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset;

providing an initial codebook, comprising:
receiving a training set of vectors from each source, and
deriving the initial codebook from the training sets using a generalized Lloyd algorithm.

14. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and providing an initial mapping function, comprising:
receiving a training set of vectors from each source; and,
deriving the initial mapping function by performing a generalized Lloyd algorithm over a training set for each source.

15. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and, associating each state of an encoder with a source.

16. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and, associating each class of vectors with a source.

17. A method for designing a universal codebook for quantizing vectors associated with different sources, comprising:

providing a codebook and a mapping function, the mapping function identifying subsets of codevectors in the codebook corresponding to different sources;

updating the mapping function using the codebook, the mapping function being chosen to reduce distortion when the vectors from a source are quantized using a corresponding subset; and associating groups of vectors arising from a given source with a different source name, the mapping function associating a subset of the codebook with each source name.

\* \* \* \* \*